United States Patent [19]

Baird

[11] Patent Number: 4,975,979

[45] Date of Patent: Dec. 4, 1990

[54] THREE PHASE MOTOR CONTROL FOR DOWNHOLE LOGGING TOOLS

[75] Inventor: Gary K. Baird, Richmond, Tex.

[73] Assignee: Halliburton Logging Services, Inc., Houston, Tex.

[21] Appl. No.: 390,942

[22] Filed: Aug. 7, 1989

[51] Int. Cl.⁵ .............................................. H02P 3/18
[52] U.S. Cl. ...................................... 388/814; 388/815; 388/907.5; 212/76; 318/808; 318/799
[58] Field of Search ................. 388/809–815, 388/801, 802, 805–806; 212/76, 71; 318/771, 780, 798–802, 806–810, 812

[56] References Cited

U.S. PATENT DOCUMENTS

| | | | |
|---|---|---|---|
| 3,887,898 | 6/1975 | Jones | 340/18 R |
| 3,932,836 | 9/1974 | Harrell et al. | 318/721 |
| 4,021,700 | 5/1977 | Ellis-Annyl | 361/24 |
| 4,100,528 | 7/1978 | Bernard et al. | 388/812 |
| 4,365,506 | 12/1982 | Hyde | 318/490 |
| 4,446,415 | 5/1984 | Taylor et al. | 318/806 |
| 4,541,787 | 9/1985 | DeLong | 318/134 |
| 4,691,155 | 9/1987 | Taylor et al. | 318/806 |
| 4,692,673 | 9/1987 | DeLong | 318/132 |
| 4,695,779 | 9/1987 | Yates | 388/820 |
| 4,734,634 | 3/1988 | Kito et al. | 318/808 |

OTHER PUBLICATIONS

Alexander Strong and Dave Hoffman, Application Note, Three Phase Motor Controller, Jan. 1979.

Primary Examiner—William M. Shoop, Jr.
Assistant Examiner—David Martin
Attorney, Agent, or Firm—William J. Beard

[57] ABSTRACT

A logging tool motor controller inverter and feedback loop control system is set forth. A conductor is extended along the logging cable to provide electrical power at a frequency and voltage determined at the surface. In the logging tool, a rectifier connected to the conductor 40 form a DC current applied to three DC switches which operate in timed sequence to provide multiphase switched DC for operation of the motor. A feedback loop includes an instantaneous measuring wattmeter for determining power consumption of the motor, a variable frequency oscillator which is driven thereby between upper and lower frequency limits, and a multiphase controller connected to the variable frequency oscillator for timely switching the DC switches delivering power to the motor.

14 Claims, 1 Drawing Sheet

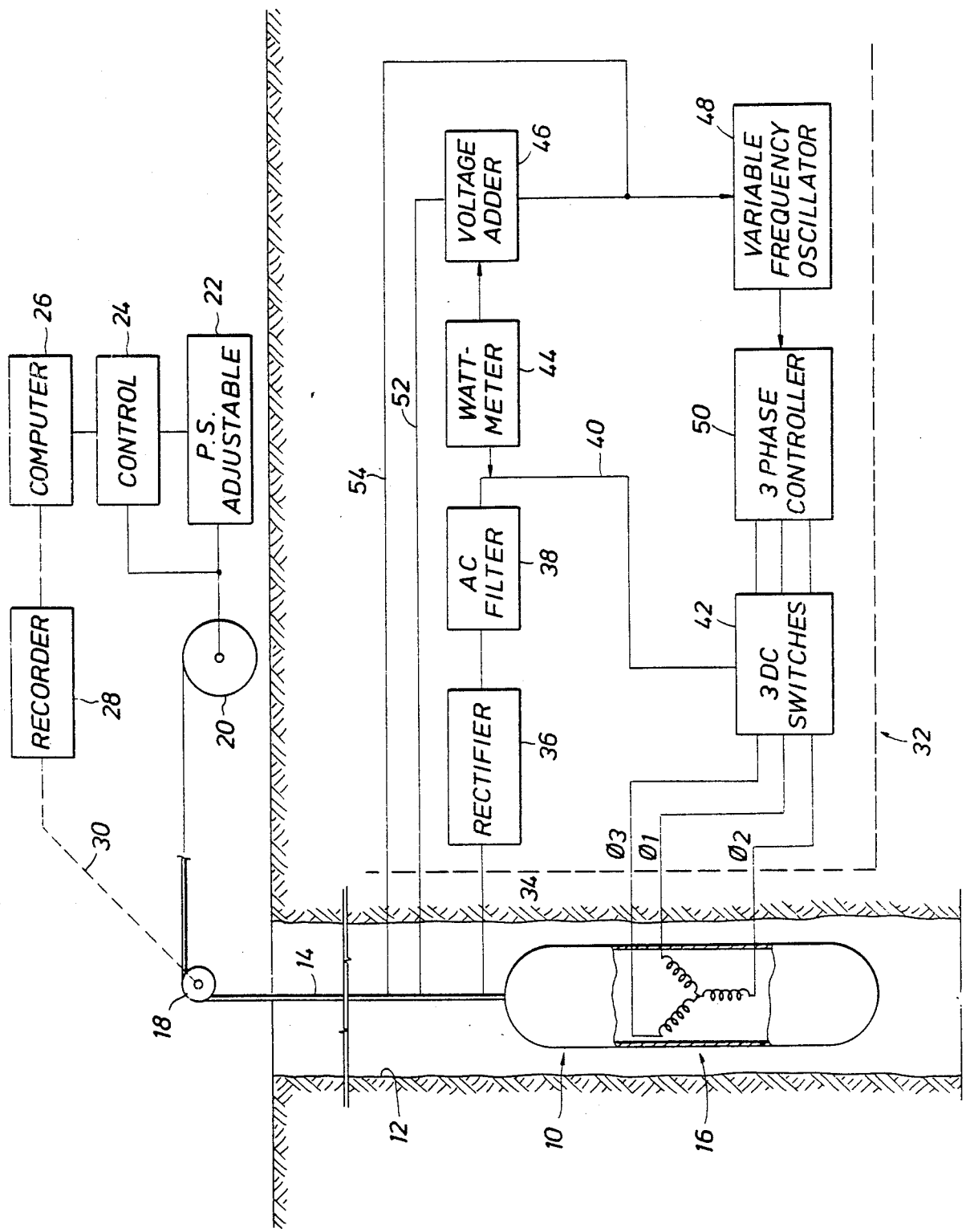

4,975,979

THREE PHASE MOTOR CONTROL FOR DOWNHOLE LOGGING TOOLS

BACKGROUND OF THE DISCLOSURE

The present disclosure is directed to a motor controller and in particular a motor controller for use in a downhole logging tool. This motor controller finds great use in downhole logging tools, and provides a motor controller for a three phase motor incorporated in the logging tool which delivers controllable torque with a more efficient power transfer of electrical power furnished at the surface through the logging cable to the logging tool which incorporates the motor.

Electric motors are included often in downhole logging tools. As wells become deeper, the power requirements of the electric motors in such logging tools become more severe. In general terms, deeper wells suggest the requirements of greater power and yet the logging tool must have a reduced diameter. One helpful step has been to advance from a single phase motor to a three phase motor. As diameter of the logging tool decreases, the size of the motor is constricted, motor design becomes limited. To overcome some of these limitations derived from size and space constraints, it is necessary to increase the AC frequency of the power applied to the motor.

In shallow wells, an increase from 60 hertz to 400 hertz can be tolerated with no loss. As the frequency increases, the net power loss to capacitance in the cable increases. Fortunately, if the well is shallow that is not much of a problem. However, even if the well is shallow, often it will be serviced with a tool which is connected to the end of a very long logging cable while most of the cable remains spooled on a storage drum. Accordingly, even a shallow well may engender certain problems, mainly, the fact that it must be serviced by a long logging cable. The power loss in the logging cable thus becomes a significant factor. An increase from 60 to 400 hertz for the power supplied to the logging cable encounters more than a six fold increase in power loss in the logging cable. While the logging cable can be designed so that capacitance per unit length is reduced, it nevertheless cannot be sufficiently reduced to overcome the six fold increase with a change in frequency to 400 hertz.

One approach is to utilize direct current. This is shown in U.S. Pat. No. 3,887,898 which delivers a direct current along the logging cable. Then, an inverter is used to enable power conversion at the logging tool. There is however limited control capacity available so that the motor which is operated by this equipment can be varied in operation.

The disclosed apparatus provides a system which is far more flexible than that set forth in the referenced patent. This system includes a control system able to control the motor in a variety of situations. This is a marked advantage over the control system set forth in U.S. Pat. No. 4,734,634 which suggests control variation to pick up control of a motor after a momentary inverter interruption of the sort typically occasioned by power loss. The present disclosure thus sets forth a feedback based motor controller which provides variable speed and feedback control as a function of power which is a marked advance over the 1979 application notes of Siliconix.

The present apparatus can be summarized as a three phase power inverter which can be used in a logging tool and which can be powered by either DC or AC power at a relatively low frequency to enable power transmission along the logging cable without excessive power dissipation. The inverter converts the applied DC or low frequency AC into AC having any frequency. Moreover, the conversion to the selected frequency for AC operation of the motor is subject to local control. This is particularly helpful because the typical motor performance relationship of speed versus torque comes into play and can be uniquely handled. That is, the motor in the logging tool is typically used to provide drive to a motorized, pad mounted device. The pad mounted device normally is retracted against the body of the logging tool and is extended outwardly to an opened position. When the pad first moves, there is no resistance encountered and torque requirements are thus low while speed requirements are high. For this moment, the motor is ideally operated at a higher frequency to advance at a higher speed. The arms move outwardly until they contact the surrounding wall of the borehole at which time motor speed should be reduced while providing maximum torque. The torque should increase so that the arms are adequately forced against the sidewall. This involves a feedback system regulating speed versus torque.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

In summation, the present system incorporates a feedback controlled mechanism which permits feedback control to obtain the desirable torque and speed relationship.

The single FIGURE shows a motorized logging tool suspended in a well borehole on a logging cable wherein a power supply at the surface provides electrical power for the logging tool and a three phase motor in the logging tool is controllably powered and operated at variable speed by the circuit of the present disclosure.

DETAILED DESCRIPTION OF THE PREFERRED EMBODIMENT

Going to the single drawing, a sonde 10 supported in a well borehole 12 on a logging cable 14 includes a three phase motor 16 which requires electrical power for operation. The sonde has been broken away so that the motor on the interior is shown, and it has been illustrated as a three phase motor. Obviously, the motor can be provided with wye or delta windings, and is incorporated to provide power to apparatus in the sonde. Typically, such apparatus includes a set of arms which are retracted against the sonde and which extend outwardly to set the tool against the sidewall of the borehole 12. The logging cable 14 supports the sonde in the borehole 12, and it extends upwardly to the surface where it passes over a sheave 18, and is spooled on a storage drum 20. There are one or more conductors in the cable 20. The cable 20 is normally formed with a surrounding outer wrap which provides protection to the cable so that the conductors are safely secured therein and there is also sufficient strength in the cable to support the sonde in the well. The conductors in the cable connect with various components which are necessary for operation including an adjustable power supply 22, a control system 24 and a CPU 26. Data that is collected from the logging tool 10 can be of any description, and is delivered typically through a telemetry system up the logging cable 14 and is ultimately processed by the CPU 26. This data is recorded by recorder 28. It is important that the data be recorded as a function of depth so that the data can be correlated to the formations encountered by the borehole, and to this end a mechanical or electrical depth measuring mechanism 30 is typically connected from the sheave 18 to the recorder 28 to provide a signal indicative of depth location of the sonde in the well. The cable 14 incorporates various and sundry conductors which are appropriate for operation of the present invention as will be detailed.

The numeral 32 generally identifies the inverter and control system which is enclosed within the dotted line. This is equipment which is located in the sonde. There is a conductor in the logging cable 14 which provides either DC or AC power at a very low frequency. The voltage is adjusted at the surface to provide the necessary motor voltage. The motor voltage is increased or decreased by surface control of the supply voltage. This conductor 34 is input to a rectifier 36. The rectifier forms a DC output at a specified level relative to the input. It is passed through an AC filter 38 which removes harmonics and provides smoothing. In turn, that delivers DC power on a conductor 40 which is connected to three duplicate DC switches 42. The DC switches are connected to the three phases of the motor 16. The motor is provided with switched DC power at each of the three phases. The three phases are switched, the switching occurring at 120° timing. The phase sequence (1-2-3 or 1-3-2) controls the direction of rotation of the motor. This controls motor rotation either clockwise or counter clockwise.

The three DC switches provide switched output current at a duty cycle of 180° off and 180° on. This provides a fundamental frequency for the power; there are of course harmonics included as a result of the square wave current furnished.

Power delivered to the DC switches is monitored by a wattmeter 44. The wattmeter 44 forms an output signal which is proportional to the power consumption. That signal is delivered to a voltage adder circuit 46. That signal in turn is furnished to a variable frequency oscillator 48. The VFO 48 forms an output signal which is fixed in frequency dependent on the input voltage. In other words, the frequency tracks the voltage. It is a voltage controlled oscillator. It has a frequency range up to several hundred hertz. That output signal is provided to a three phase controller 50. The controller 50 provides three synchronized switching signals for the DC switches 42 to timely operate these switches.

The voltage adder is provided with a control signal from the surface which is input on the conductor 52. The output of the voltage adder is delivered to the surface on a conductor 54. The difference between these two signals is the output of the wattmeter 44. This permits transfer of the instantaneous power consumption to the surface. That is, the power is measured and the monitored signal is delivered to the surface. Moreover, the system includes a feedback control system which is response to instantaneous power consumption and which permits the motor 16 to operate in the desired fashion.

Tracing through a sequence of operation, the control system accomplishes the following. First of all, assume that the motor 16 is to be operated where it encounters very little resistance for the first three seconds of operation and thereafter encounters substantial resistance and requires greater torque for an additional six seconds. In this example, a command signal is applied to the motor simply by providing electrical power from the power supply 22. This power is input along the logging cable at the desired current, voltage and frequency. Recall that it is desirable to keep the frequency low so that power dissipation along the cable is held to a minimum. In any event, assuming that a low frequency AC drive is applied, that supply current is rectified at the rectifier 36 and power is directly applied to the DC switches 42. The power required for motor operation is relatively low and the current is relatively low. This power is subject to control of the feedback loop and is provided at the frequency selected by the VFO 48. When the motor encounters substantial load, this is manifested by an increase in power delivered to the motor and that is inturn sensed by the wattmeter 44. This forms an instantaneous output indicative of this fact which is conveyed to the VFO 48 and which changes the motor frequency. As the frequency decreases, the current increases and the torque of the motor is increased. When that occurs, the motor is more able to complete the maneuver required of the logging tool and ultimate completion can be sensed by an even greater increase in instantaneous power as the motor approaches a stall condition. That can be sensed, and a signal can be transferred from the control system back to the surface to enable power cutoff. Cutoff can be implemented quite easily simply by interrupting delivery of the power from the surface power supply 22.

In the foregoing, it is accomplished with a minimum of power dissipation in the logging cable. Even if the logging tool 10 is only a few hundred feet deep in the borehole, the logging cable 14 may have length as great as 25,000 feet with the great bulk of the length stored on the drum. In that instance, the logging cable still is effectively long and the cable capacitance still remains at deterrent. The foregoing system however overcomes power dissipation in the logging cable by incorporation of the low frequency power supply.

The present apparatus is able to be used at any depth in the borehole. At greater depths, there may be even greater power losses at 60 hertz and especially at 400 hertz. By the choice of frequency from the power supply 22, the power dissipation can be markedly reduced and the speed of response of the motor can be markedly increased independently of supply frequency.

The present system does not always require a signal on the conductor 52. That can be used to control the starting frequency of the motor. However, the motor is subject to control of the VFO, and the set points for the voltage-frequency relationship can be varied. If for instance, the wattmeter measures zero power consumption and forms an output signal of zero, the VFO set points can be arranged so that there is a maximum frequency which can be 400 hertz as an example. As power increases, the wattmeter output signal will increase and the VFO can be adjusted so that the end point for maximum power is slower operation of the motor; for example, the application of 10 hertz power to the motor. It will be understood that calibration of the VFO in relationship to the output voltages of the wattmeter 44 becomes a mechanism whereby end points can be controlled. Since the end points are controlled, the minimum and maximum speeds of the motor can be determined, and the motor is typically operated in a linear relationship between these two end points where the speed is increased while torque is decreased.

No particular detriment results from driving the motor with a square wave. The square wave of course contains the fundamental frequency of the power delivered to the motor, the frequency thereof being determined by the VFO 48. Amplitude of the electrical current furnished through the DC switches 42 is partly determined by the adjustable power supply at the surface. For instance, if a first voltage is furnished to the system, the rectifier has a specified scale factor. If that input voltage is doubled, then the applied voltage furnished to the motor 16 will be also doubled. In summation, the feedback control system permits the motor to be powered at a controlled frequency to provide the desired torque performance from the motor and this is accomplished under local feedback control. It is subject to override from the surface as for instance by provision of a function on the conductor 52 which fixes the speed of the motor by fixing the frequency of the VFO 48. While the foregoing is directed to the preferred embodiment, the scope thereof is determined by the claims which follow:

What is claimed is:

1. A motor control system for a downhole tool equipped with a motor, comprising:
   (a) a current conductor extending along a logging cable connected at one end to a downhole tool wherein the cable is deployed at the surface adjacent to a well and has a length sufficient to raise the tool from deep wells toward the surface, and wherein the remaining end of the current conductor is connected to a surface located power supply providing current to said conductor at a frequency ranging from zero to some maximum frequency;
   (b) DC current forming means provided with current from said conductor to form an output current;
   (c) current switching means connected to said current means for forming output current flowing in multiple conductors connected to a multiphase motor;
   (d) multiphase controller means connected to said switch means to control operation of said switch means; and
   (e) speed control means connected to said controller means for controlling speed of said motor wherein said speed control means forms a speed setting variable between high and low motor speeds.

2. The apparatus of claim 1, wherein said current conductor is a part of a logging cable and the logging cable is adapted to be spooled on a reel at the surface of a well borehole having one end extending into the borehole to a length sufficient to raise and lower a logging tool therein wherein the logging tool incorporates the motor, and further wherein the current conductor has an end at the surface adapted to be connected with a power supply which provides electric current to the conductor at a frequency defining alternating current on the conductor, and said DC current forming means rectifies the current applied thereto and forms an output current on separate conductors for each of the phases of the multiphase motor wherein the separate phases are connected through said current switching means so that each of the separate phases is individually switched by said switching means, and further wherein said speed control means controls the motor speed by controlling the repetition rate of said switching means to provide a control signal for operation of the motor.

3. The control system of claim 1 wherein said control means comprises a watt meter measuring motor power consumption and forms a signal indicative of power consumption and the signal encodes power consumption which becomes a speed control setting for said controller means.

4. The control system of claim 3 wherein said wattmeter measures power and forms a signal indicative of power during motor operation, and said control means further includes means responsive to a selected control signal provided from the surface.

5. The control system of claim 4 wherein said wattmeter measures instantaneous power and forms an output signal proportional to power and the output signal is supplied to a voltage adding means, said voltage adding means having output terminal connected to a variable frequency oscillator and said oscillator performs an output signal at a frequency selected for operation of said motor.

6. The control system of claim 1 wherein said speed control means comprises:
   a. a variable frequency oscillator forming an output signal at a selected frequency between upper and lower frequency limits;
   b. a multiphase controller connected to said variable frequency oscillator and forming three separate phase output signals;
   c. means for connecting the output of said controller to said switch means for providing three timed phase switching signals for operation of said switch means to provide three phase switching of power for said motor.

7. The apparatus of claim 6 wherein said motor is a three phase motor and said switch means are switched in a sequence to thereby control direction of rotation of said motor.

8. The apparatus of claim 1 including a rectifier in said control system connected with a conductor of the logging cable wherein the conductor extends from the surface and provides AC power thereto, and further including means for providing the output of said rectifier to said multiphase switch means for switching to form multiphase current flow for operation of said motor.

9. The apparatus of claim 8 wherein said rectifier is connected with an AC filter for suppressing AC components therein.

10. The apparatus of claim 9 wherein said rectifier and filter form a DC current flow which is delivered to said multiphase switch means, and further including a wattmeter connected thereto for measurement of instantaneous power.

11. A method of controlling operation of a multiphase motor in a logging tool supported on a logging cable lowered and raised in a well borehole wherein the method comprises the steps of:
   a. providing a selected power level on a conductor in the cable for operation of the motor in the logging tool lowered or raised in a well borehole;

b. in the logging tool rectifying the power from the logging cable conductor for application to the multiphase motor in the logging tool;

c. instantaneously measuring power consumption of the motor in the logging tool and forming a signal indicative of power consumption; and d. as a function of the power consumption output signal, forming a frequency variable control signal which controls operation of power switching means delivering rectified power to the motor in the logging tool at a frequency and current dependent on the requirements of the motor.

12. The method of claim 11 including the step of connecting a feedback loop to said switching means from a wattmeter.

13. The method of claim 12 wherein said loop supplies a variable signal, and controlling the variable signal to control the motor.

14. The method of claim 11 including the initial step of providing current at a selected frequency from zero up to some maximum frequency wherein the current is placed on the conductor in the cable, and said current is rectified for application to the multiphase motor in the logging tool, and wherein said step of measuring power consumption forms an instantaneous feedback signal for control of the power switching means to thereby control the frequency of power switching.

* * * * *